United States Patent
Fujibayashi et al.

Patent Number: 6,133,935
Date of Patent: Oct. 17, 2000

[54] OPTICAL SCANNING APPARATUS

[75] Inventors: Kazuo Fujibayashi, Kawasaki; Koji Hoshi, Yokohama; Manabu Kato; Yoshihiro Ishibe, both of Kawasaki, all of Japan

[73] Assignee: Canon Kabushiki Kaisha, Tokyo, Japan

[21] Appl. No.: 08/987,635

[22] Filed: Dec. 9, 1997

[30] Foreign Application Priority Data

Dec. 19, 1996 [JP] Japan ................... 8-354465
Mar. 13, 1997 [JP] Japan ................... 9-078933

[51] Int. Cl.⁷ .................................. G02B 26/08
[52] U.S. Cl. ............... 347/258; 347/241; 347/244; 359/205; 359/206
[58] Field of Search ................... 347/241, 244, 347/256, 258, 259; 359/205, 206

[56] References Cited

U.S. PATENT DOCUMENTS

| | | | |
|---|---|---|---|
| 5,111,219 | 5/1992 | Makino | 347/259 |
| 5,828,401 | 10/1998 | Shiraishi | 347/259 |

FOREIGN PATENT DOCUMENTS

| | | |
|---|---|---|
| 0 730 182 | 9/1996 | European Pat. Off. . |
| 56-36622 | 4/1981 | Japan . |
| 61-48684 | 3/1986 | Japan . |
| 61-175607 | 8/1986 | Japan . |
| 63-157122 | 6/1988 | Japan . |
| 450908 | 2/1992 | Japan . |
| 4-110817 | 4/1992 | Japan . |
| 4104213 | 4/1992 | Japan . |
| WO 91/14959 | 10/1991 | WIPO . |

*Primary Examiner*—N. Le
*Assistant Examiner*—Hai C. Pham
*Attorney, Agent, or Firm*—Fitzpatrick, Cella, Harper & Scinto

[57] ABSTRACT

An optical scanning apparatus in which the luminous flux emitted from a light source is deflected by a deflecting device and formed by an optical device into a spot-shaped image on a plane to be scanned. The optical device has first and second toric lenses. The first toric lens has both lens surfaces formed into aspherical shapes in the main scanning cross section and has a meniscus shape in which a concave surface faces the deflecting device in the vicinity of the center of scanning and which provides a positive refractive power. The second toric lens has both lens surfaces formed into aspherical shapes in the main scanning cross section and has a meniscus shape in which a convex surface faces the deflecting device in the vicinity of the center of scanning and which provides a positive refractive power. Sections of the toric lenses perpendicular to a generating line in a sub-scanning cross section both have meniscus shapes which provide concave surfaces facing the deflecting device and which provide a positive refractive power.

42 Claims, 10 Drawing Sheets

OPTICAL SCANNING APPARATUS

BACKGROUND OF THE INVENTION

1. Field of the Invention

The present invention relates to an optical scanning apparatus and, more particularly, to an optical scanning apparatus ideally suited to, for example, a laser beam printer (LBP) apparatus and a digital copying machine having an electrophotographic process wherein a luminous flux optically modulated and emitted from a light source means is deflectively reflected by an optical deflector composed of a rotary polygon mirror or the like, then applied onto a plane to be scanned through an image optical system having fθ characteristics (an fθ lens unit) in order to optically scan the plane to record image information.

2. Description of Related Art

In a conventional optical scanning apparatus used for a laser beam printer or the like, a luminous flux optically modulated and emitted from a light source means according to an image signal is periodically deflected by an optical deflector constituted by, for example, a rotary polygon mirror, then it is converged on a surface of a photosensitive recording medium (photosensitive drum) into a spot shape by an image optical system having fθ characteristics, so that the surface is optically scanned to record images.

FIG. 1 is a schematic cross section in the main scanning direction of an essential section of a conventional optical scanning apparatus. In the drawing, a divergent luminous flux emitted from a light source means 11 is formed into a nearly parallel beam through a collimator lens 12, and it is restricted in terms of the quantity of light by a stop 13 before being launched into a cylindrical lens 14 having a predetermined refractive power only in the sub-scanning direction. The parallel luminous flux launched into the cylindrical lens 14 comes out in the main scanning cross section as is, whereas it is converged in the sub-scanning cross section to form a nearly line-shaped image on a deflection surface, i.e. a reflection surface, 15a of an optical deflector 15 composed of a rotary polygon mirror.

The luminous flux deflectively reflected by the deflection surface 15a of the optical deflector 15 is guided to the plane of a photosensitive drum 18 serving as a plane to be scanned through an image optical system (an fθ lens unit) 16 having fθ characteristics. As the optical deflector 15 is rotated in the direction indicated by arrow A, the surface of the photosensitive drum 18 is optically scanned to record the image information.

For this type of optical scanning apparatus to achieve highly precise recording of image information, it is required that the field curvature be successfully compensated for, the spot diameter be uniform over the entire plane to be scanned, and the distortion aberration exhibit fθ characteristics wherein the angle of incident light and image height have a proportional relationship. Various optical scanning apparatuses having such optical characteristics or compensation optical systems (fθ lens units) therefor have been proposed in the past.

With an increasing trend toward more compact design and lower cost of laser beam printers, digital copying machines, etc., optical scanning apparatuses are also being required to be made more compact and less expensive.

Various optical scanning apparatuses having an fθ lens unit composed of a single lens which satisfy the demands mentioned above have been proposed; some of them have been disclosed in, for example, Japanses Patent Publication No. 61-48684, Japanses Patent Laid-Open No. 63-157122, Japanses Patent Laid-Open No. 4-104213, and Japanses Patent Laid-Open No. 4-50908 which corresponds to U.S. Pat. No. 5,111,219.

Among these proposed apparatuses, the ones disclosed in Japanses Patent Publication No. 61-48684 and Japanses Patent Laid-Open No. 63-157122 employ, as the fθ lens unit, a single lens having a concave surface facing an optical deflector to focus the parallel beam from a collimator lens onto the plane of a recording medium. The apparatus disclosed in Japanses Patent Laid-Open No. 4-104213 employs a single lens, which has a concave surface facing the optical deflector and a toroidal surface facing an image surface, as the fθ lens into which a luminous flux converted to a convergent light beam through the collimator lens is launched. The apparatus proposed in Japanses Patent Laid-Open No. 4-50908 corresponding to U.S. Pat. No. 5,111,219 uses a single lens having high-order aspherical surfaces as the fθ lens into which a luminous flux converted to a convergent light beam through the collimator lens is launched.

The conventional optical scanning apparatus disclosed in Japanses Patent Publication No. 61-48684, however, poses a problem in that it cannot completely eliminate the field curvature in the sub-scanning direction, and that the focal length f from the fθ lens to a plane to be scanned is long because a parallel beam forms an image on the plane to be scanned, thus making it difficult to implement a compact optical scanning apparatus.

The apparatus disclosed in Japanses Patent Laid-Open No. 63-157122 is disadvantageous in that the fθ lens is thick, making it difficult to fabricate it by molding with resultant higher cost.

The apparatus proposed in Japanses Patent Laid-Open No. 4-104213 has a problem in that there is distortion aberration remaining, and that jitters are produced at intervals corresponding to the number of the polygon facets due to a mounting error of a polygon mirror serving as the optical deflector.

The apparatus disclosed in Japanses Patent Laid-Open No. 4-50908 has a high-order aspherical fθ lens to successfully compensate for aberrations; however, the spot diameter in the sub-scanning direction tends to change according to the height of an image because of uneven magnification in the sub-scanning direction between the optical deflector and the plane to be scanned.

In addition to those described above, optical scanning apparatuses using two lenses to constitute the fθ lens unit have been proposed in, for example, Japanses Patent Laid-Open No. 56-36622 and Japanses Patent Laid-Open No. 61-175607. The sections of the fθ lenses of these apparatuses are a spherical or slightly aspherical, making it difficult to attain more compact design, lower cost, and higher precision.

SUMMARY OF THE INVENTION

Accordingly, it is an object of the present invention to provide a compact optical scanning apparatus, which is suited for high-resolution printing, compensates for field curvature and/or distortion aberration and prevents changes in spot diameter in the sub-scanning direction attributable to changes in the height of images, by combining two lenses having appropriate shapes to constitute an fθ lens unit for forming a convergent light beam from a collimator lens onto a plane to be scanned via an optical deflector.

To this end, according to one aspect of the present invention, there is provided an optical scanning apparatus equipped with: a first optical device for converting a luminous flux emitted from light source means into a convergent light beam; a second optical device for forming the luminous flux into a line-shaped, longitudinal image in a main scanning direction on a deflecting surface of a deflecting device; and a third optical device for forming the luminous flux which has been deflected by the deflecting device into a spot-shaped image on a plane to be scanned;

wherein the third optical device has a first toric lens and a second toric lens disposed in the mentioned order from the deflecting device; the first toric lens has both surfaces thereof formed into aspherical shapes in the main scanning cross section and has a meniscus shape which provides a concave surface facing the deflecting device in the vicinity of the center of scanning and which provides a positive refractive power; the second toric lens has both surfaces thereof formed into aspherical shapes in the main scanning cross section and has a meniscus shape which provides a convex surface facing the deflecting device in the vicinity of the center of scanning and which provides a positive refractive power; and the sections of the first toric lens and the second toric lens perpendicular to a generating line in a sub-scanning cross section both have meniscus shapes which provide concave surfaces facing the deflecting device and which provide a positive refractive power.

In the second toric lens of the optical scanning apparatus, the curvature of the lens surface facing the plane to be scanned continuously changes from the center of the lens toward the periphery of the lens in the main scanning cross section and the sign of the curvature is reversed in the middle part therebetween.

In the optical scanning apparatus, the first toric lens and the second toric lens are fabricated by plastics molding.

In the optical scanning apparatus, the refractive power of the first toric lens in the sub-scanning cross section continuously increases from the center of the lens toward the periphery of the lens, whereas the refractive power of the second toric lens in the sub-scanning cross section continuously decreases from the center of the lens toward the periphery of the lens.

In the optical scanning apparatus, the curvature of a lens surface of the second toric lens in the sub-scanning cross section changes laterally symmetrically in the main scanning direction from the center of the lens.

In the optical scanning apparatus, the symmetry axis of the second toric lens in the main scanning direction is inclined in the main scanning cross section with respect to the normal of the plane to be scanned.

In the optical scanning apparatus, if the focal lengths of the first toric lens and the second toric lens in the main scanning cross section are denoted as f6 and f7, respectively, then the following condition is satisfied:

$$0.08 < f6/f7 < 0.17.$$

In the first toric lens of the optical scanning apparatus, the curvature of its lens surface facing the plane to be scanned in the sub-scanning cross section changes laterally asymmetrically from the center of the lens toward the periphery of the lens.

In the optical scanning apparatus, the third optical device satisfies the condition given below when the angular magnification at the central part of an effective image on the plane to be scanned in the sub-scanning cross section between the deflecting device and the plane to be scanned is denoted as $r_{SC}$:

$$0.25 < r_{SC} < 0.67.$$

In the optical scanning apparatus, the refractive power of the first toric lens in the sub-scanning cross section continuously increases from the center of the lens toward the periphery of the lens, whereas the refractive power of the second toric lens in the sub-scanning cross section continuously decreases from the center of the lens toward the periphery of the lens; and the third optical device satisfies the condition shown below when the angular magnification at the central part of an effective image on the plane to be scanned in the sub-scanning cross section between the deflecting device and the plane to be scanned is denoted as $r_{SC}$ and the angular magnification at an arbitrary point in the entire image area is denoted as $r_{So}$:

$$0.85 < r_{So}/r_{SC} < 1.15.$$

According to another aspect of the present invention, there is provided an optical scanning apparatus equipped with: a first optical device for converting a luminous flux emitted from light source means into a convergent light beam; a second optical device for forming the luminous flux into a line-shaped, longitudinal image in a main scanning direction on a deflecting surface of a deflecting device; and a third optical device for forming the luminous flux which has been deflected by the deflecting device into a spot-shaped image on a plane to be scanned;

wherein the third optical device has a first toric lens and a second toric lens disposed in the mentioned order from the deflecting device, the first toric lens has both surfaces thereof formed into aspherical shapes in the main scanning cross section and has a meniscus shape which provides a concave surface facing the deflecting device in the vicinity of the center of scanning and which provides a positive refractive power, the second toric lens has both surfaces thereof formed into aspherical shapes in the main scanning cross section and has a meniscus shape which provides a convex surface facing the deflecting device in the vicinity of the center of scanning and which provides a positive refractive power, and the sections of the first toric lens and the second toric lens perpendicular to a generating line in a sub-scanning cross section both have meniscus shapes which provide concave surfaces facing the deflecting device and which provide a positive refractive power; and if the focal lengths of the first toric lens and the second toric lens in the main scanning cross section are denoted as f6 and f7, respectively, then the following condition is satisfied:

$$0.08 < f6/f7 < 2.0.$$

In the second toric lens of the optical scanning apparatus, the curvature of the lens surface facing the plane to be scanned continuously changes from the center of the lens toward the periphery of the lens in the main scanning cross section and the sign of the curvature is reversed in the middle part therebetween.

In the optical scanning apparatus, the first toric lens and the second toric lens are fabricated by plastics molding.

In the optical scanning apparatus, the refractive power of the first toric lens in the sub-scanning cross section continuously increases from the center of the lens toward the periphery of the lens, whereas the refractive power of the second toric lens in the sub-scanning cross section continuously decreases from the center of the lens toward the periphery of the lens.

In the optical scanning apparatus, the curvature of a lens surface of the second toric lens in the sub-scanning cross section changes laterally symmetrically in the main scanning direction from the center of the lens.

In the optical scanning apparatus, the symmetry axis of the second toric lens in the main scanning direction is inclined in the main scanning cross section with respect to the normal of the plane to be scanned.

In the first toric lens of the optical scanning apparatus, the curvature of its lens surface facing the plane to be scanned in the sub-scanning cross section changes laterally asymmetrically from the center of the lens toward the periphery of the lens.

In the optical scanning apparatus, the third optical device satisfies the condition given below when the angular magnification at the central part of an effective image on the plane to be scanned in the sub-scanning cross section between the deflecting device and the plane to be scanned is denoted as $r_{SC}$:

$$0.25 < r_{SC} < 0.67.$$

In the optical scanning apparatus, the refractive power of the first toric lens in the sub-scanning cross section continuously increases from the center of the lens toward the periphery of the lens, whereas the refractive power of the second toric lens in the sub-scanning cross section continuously decreases from the center of the lens toward the periphery of the lens; and the third optical device satisfies the condition shown below when the angular magnification at the central part of an effective image on the plane to be scanned in the sub-scanning cross section between the deflecting device and the plane to be scanned is denoted as $r_{SC}$ and the angular magnification at an arbitrary point in the entire image area is denoted as $r_{So}$:

$$0.85 < r_{So}/r_{SC} < 1.15.$$

DESCRIPTION OF THE PREFERRED EMBODIMENTS

Figure 1:
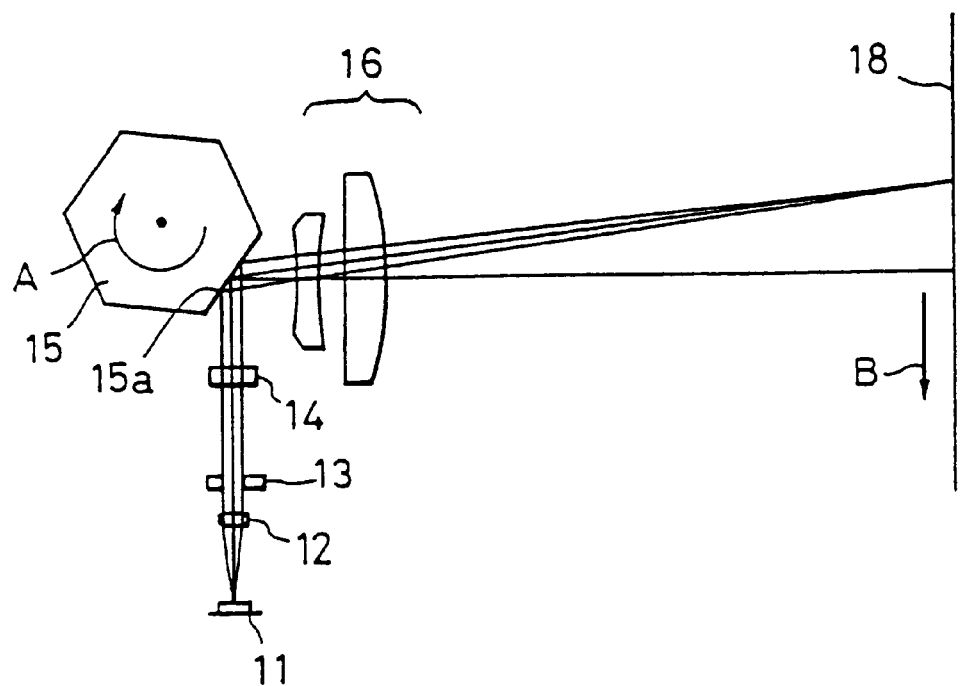
FIG. 1 is a schematic diagram showing an essential section of an optical system of a conventional optical scanning apparatus.
Figure 2:
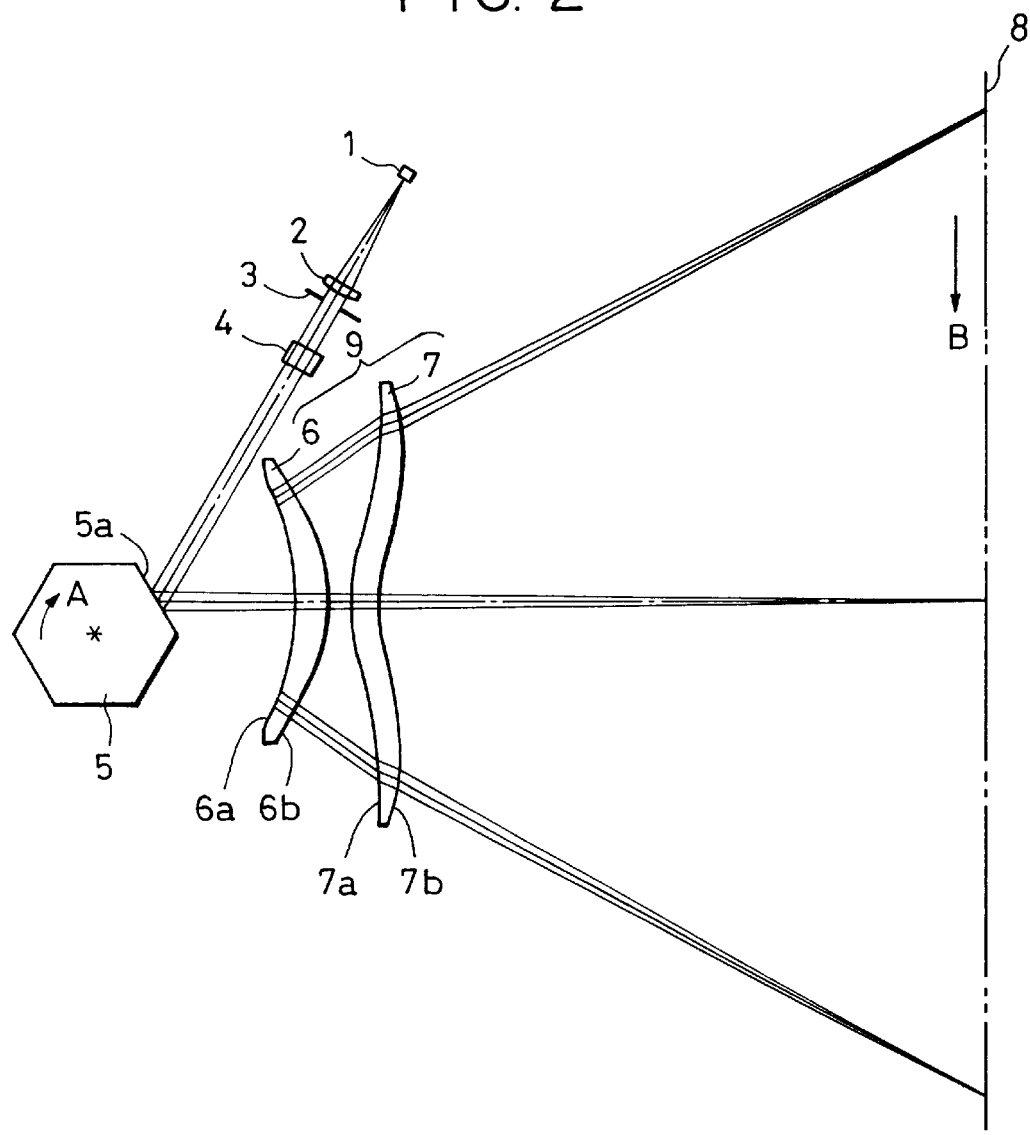
FIG. 2 is a sectional view showing an essential section in the main scanning direction of a first embodiment of an optical scanning apparatus in accordance with the present invention.

FIG. 2 is a sectional view in the main scanning direction (in the main scanning cross section) illustrating an essential part of a first embodiment of an optical scanning apparatus in accordance with the present invention. The main scanning direction herein refers to the direction in which a deflective reflection surface of an optical deflector is deflectively scanned with a luminous flux. The main scanning plane means the luminous-flux plane formed as time passes by the luminous flux used for deflective scanning by the deflective reflection surface of the optical deflector.

In FIG. 2, there are shown a light source means 1 composed of, for example, a semiconductor laser, a collimator lens 2 serving as a first optical device which converts a luminous flux, i.e. a light beam, emitted from the light source means 1 into a convergent light beam on the main scanning plane, and an aperture stop 3 for making the diameter of the luminous flux passing therethrough uniform.

There is also shown a cylindrical lens 4 serving as a second optical device which has a predetermined refractive power only in the sub-scanning direction, i.e. the direction perpendicular to the paper surface of FIG. 2. A nearly line-shaped image is formed on a deflective reflection plane 5a of an optical deflector 5 (which will be discussed later) in the sub-scanning cross section, which includes an optical axis and which is orthogonalized to the main scanning cross section, from the luminous flux that has passed through the aperture stop 3. Hence, the luminous flux striking the optical deflector 5 forms a longitudinal line-shaped image in the main scanning direction.

The optical deflector 5 is comprised of, for example, a rotary polygon mirror having six facets; it is rotated at a constant speed in the direction indicated by arrow A in the drawing by a motor or other driving means (not shown).

An fθ lens unit 9 is an image forming optical system which serves as the third optical device and which has fθ characteristics. The third optical device 9 has a first toric lens 6 and a second toric lens 7. The third optical device 9 forms an image on a photosensitive drum 8, which is a recording medium and which provides a plane to be scanned, from a luminous flux deflectively reflected by the optical deflector 5 according to image information; it also compensates for the inclination of the deflection surface of the optical deflector 5.

In this embodiment, the luminous flux emitted from a semiconductor laser 1 is converted to a convergent light beam through the collimator lens 2 in the main scanning cross section and restricted in the quantity of light thereof through the aperture stop 3 before it is launched into a cylindrical lens 4. The incident luminous flux is emitted as is in the main scanning cross section, whereas it is converged in the sub-scanning cross section to form a nearly line-shaped image (a longitudinal line-shaped image in the main scanning direction) on the deflection plane 5a of the optical deflector 5. The luminous flux deflectively reflected by the deflection plane 5a of the optical deflector 5 reaches the plane of the photosensitive drum 8 through the fθ lens unit 9. As the optical deflector 5 rotates in the direction indicated by arrow A, the plane of the photosensitive drum 8 is optically scanned in the direction indicated by arrow B to record images.

The characteristics of the first toric lens 6 and the second toric lens 7 making up the third optical device, i.e. the fθ lens unit, 9 in this embodiment will now be explained.

The third optical device 9 is constituted by the first toric lens 6 and the second toric lens 7 which both have positive refractive powers. The refractive powers of the these two lenses are properly adjusted to obtain good field curvature characteristics.

As the distance between the optical deflector 5 and the plane 8 to be scanned is decreased, the luminous flux in the main scanning direction spreads more widely; hence, the refractive power of the second toric lens 7 at which the luminous flux grows wider is set so that it is weaker than the refractive power of the first toric lens 6.

The refractive powers are so set that, if the focal lengths of the first toric lens 6 and the second toric lens 7 in the main scanning cross section are denoted as f6 and f7, respectively, then the condition given below is satisfied:

$$0.08 < f6/f7 < 2.0 \quad (1)$$

Satisfying conditional formula (1) leads to successful compensation of the field curvature and/or distortion aberration. This also permits the central thickness of the first toric lens 6 and the second toric lens 7 to be nearly equal, so that the cycle time for fabricating the two lenses by plastics molding or glass molding is shortened, and the deformation of the plane shapes of the first and second toric lenses is reduced when they are cooled for fabricating the two lenses by molding.

In this embodiment, further preferably, the ranges of the values in conditional formula (1) are set as shown below so as to obtain even better optical performance:

$$0.08 < f6/f7 < 1.7 \quad (1a)$$

$$0.08 < f6/f7 < 0.17 \quad (1b)$$

If the fθ lens unit 9 were composed of a single toric lens, then it would be difficult to maintain a good spot diameter over the entire plane to be scanned and also difficult to successfully control the change in the field curvature by only two lens surfaces of the single toric lens.

For this reason, the fθ lens unit 9 in this embodiment is composed of the two toric lenses having predetermined shapes to satisfactorily compensate for the field curvature.

The first toric lens 6 of the embodiment is aspherical on both surfaces thereof in the main scanning cross section primarily to maintain good fθ characteristics and image curvature characteristics, and it has a meniscus so that the concave surface faces the deflector in the vicinity of the center of scanning and that positive refractive power is provided.

Further, the first toric lens 6 is configured such that the curvatures of both lens surfaces (the refractive power) continuously increases in the sub-scanning cross section. The cross section perpendicular to the generating line in the sub-scanning cross section has a meniscus shape of a positive refractive power which has its concave surface facing the deflector. A lens surface 6b facing the plane to be scanned in the sub-scanning cross section is configured so that the curvature (the refractive power) thereof greatly changes laterally asymmetrically from the center of the lens toward the periphery of the lens.

This solves the problem of uneven lateral magnification in the sub-scanning direction, thus restraining the variation in spot diameter in the sub-scanning direction.

The second toric lens 7 is aspherical on both surfaces 7a and 7b thereof in the main scanning cross section, i.e. in the paper surface of FIG. 2, primarily to maintain good fθ characteristics and image curvature characteristics, and it has a meniscus shape so that the convex surface thereof faces the deflector 5 in the vicinity of the center of scanning, i.e. the center of the lens, and that a positive refractive power is provided.

Further, the second toric lens 7 is configured such that the curvature of a lens surface 7b continuously changes from the center of the lens, i.e. the center of the main scanning range, toward the periphery of the lens, and the positive sign or the negative sign of the curvature is reversed at the middle therebetween.

By configuring the second toric lens 7 as described above, the field curvature and distortion aberration are successfully compensate for over the whole scanning area.

Further, the second toric lens 7 is configured such that the curvatures of both lens surfaces 7a and 7b in the sub-scanning cross section (the section which includes the optical axis and which is orthogonal to the main scanning cross section) continuously decrease laterally symmetrically away from the center of the lens in the main scanning direction.

The cross section of the second toric lens 7 perpendicular to the generating line in the sub-scanning cross section has a meniscus shape of a positive refractive power, the meniscus shape having its concave surface facing the deflector 5. This reduces the lateral magnification in the sub-scanning direction to control the absolute value of the spot diameter to a minimum so as to maintain good image characteristics in the sub-scanning direction.

The fθ lens unit 9 is designed so that it satisfies the condition shown below when the angular magnification at the center of the effective image on the plane 8 to be scanned in the sub-scanning cross section between the optical deflector 5 and the plane 8 to be scanned is denotes as $r_{SC}$:

$$0.25 < r_{SC} < 0.67 \quad (2)$$

This conditional formula (2) has been established to maintain good image characteristics in the sub-scanning cross section while minimizing the lens length of the fθ lens unit 9 in the main scanning direction. If the lower limit value of conditional formula (2) were exceeded, then the effective luminous fluxes of the first toric lens 6 and the second toric lens 7 would spread, and the lens would grow thicker, making it difficult to implement a compact design thereof. If the upper limit value of conditional formula (2) were exceeded, then the imaging performance would be unstable because the fθ lens unit 9 is made of a plastic material susceptible to environmental changes including temperature changes.

Further, the embodiment is designed such that the refractive power of the first toric lens 6 in the sub-scanning cross section continuously increases from the center to periphery of the lens, while the refractive power of the second toric lens 7 continuously decreases from the center to periphery of the lens; and the fθ lens unit 9 satisfies the condition given below when the angular magnification at the center of the effective image on the plane 8 to be scanned in the sub-scanning cross section between the optical deflector 5 and the plane 8 to be scanned is denotes as $r_{SC}$ and the angular magnification at an arbitrary point in the entire image area is denoted as $r_{SO}$:

$$0.85 < r_{SO}/r_{SC} < 1.15 \quad (3)$$

Conditional formula (3) is provided to make the spot diameter uniform in the sub-scanning cross section on the plane 8 to be scanned from the center toward the periphery of the plane 8 to be scanned. If the upper limit value of conditional formula (3) were exceeded, the spot diameter at the edge of an image, i.e. the peripheral area of the plane 8 to be scanned, in the main scanning direction would become undesirably small for the central part; if the lower limit value of conditional formula (3) were exceeded, then the spot diameter at the edge of an image in the main scanning direction would become undesirably large for the central part, leading to the loss of uniformity of the spot diameter in the sub-scanning cross section.

In this embodiment, the toric lenses are provided with aspheric shapes that can be represented by a function having up to a term of the tenth degree in the main scanning direction; they have spherical surfaces that continuously change in the direction of the height of images in the sub-scanning direction. The lenses are shaped such that the direction of the generating line corresponding to the main scanning direction is expressed by the formula shown below when, for example, the intersection point of the toric lenses and the optical axis is defined as the origin, the direction of the optical axis is taken on the X-axis, the axis orthogonal to the optical axis in the main scanning surface is taken on the Y-axis, and the axis orthogonal to the optical axis in the sub-scanning surface is taken on the Z-axis:

$$X = \frac{Y^2/R}{1 + (1-(1+K)(Y/R^2)^{1/2}} + B_4 Y^4 + B_6 Y^6 + B_8 Y^8 + B_{10} Y^{10}$$

where R denotes the radius of the curvature; and K, $B_4$, $B_6$, $B_8$, and $B_{10}$ denote aspherical coefficients.

The radius of the curvature of the sub-scanning cross section continuously changes as the lens surface coordinate in the main scanning direction changes. Curvature radius r', in a case where the coordinate on the main scanning surface is Y, is expressed by an expression given below:

$$r' = r(1 + D_2 Y^2 + D_4 Y^4 + D_6 Y^6 + D_8 Y^8 + D_{10} Y^{10})$$

where r denotes the radius of curvature on the optical axis, and $D_2$, $D_4$, $D_6$, $D_8$, $D_{10}$ are coefficients.

In this case, if the value of Y is positive, then the radius of curvature r' is calculated using the coefficients accompanied by subscript "U" as in $D_{2U}$, $D_{4U}$, $D_{6U}$, $D_{8U}$, $D_{10U}$; if the value of Y is negative, then the radius of curvature r' is calculated using the coefficients accompanied by subscript "L" as in $D_{2L}$, $D_{4L}$, $D_{6L}$, $D_{8L}$, $D_{10L}$.

Figure 3:
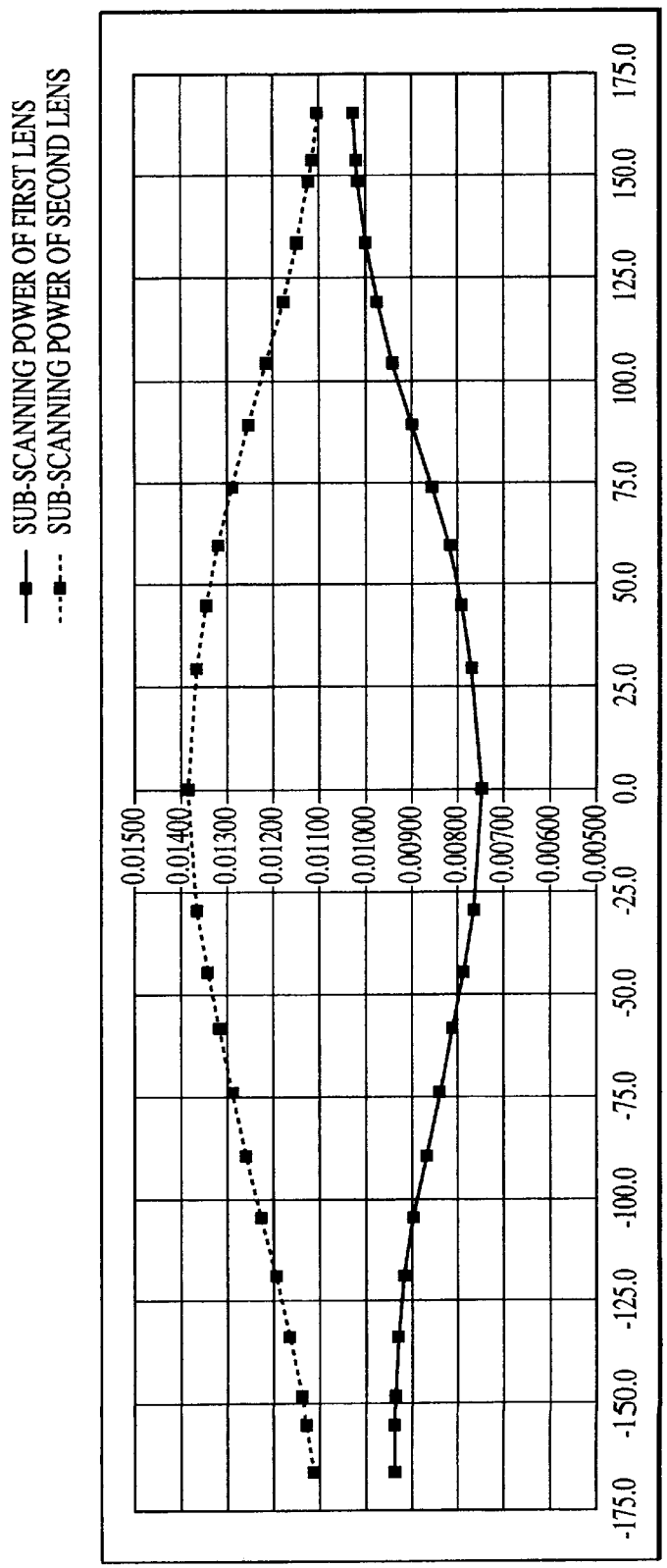
FIG. 3 is a schematic representation illustrative of the refractive powers in the sub-scanning direction of first and second toric lenses of the first embodiment in accordance with the present invention.
Figure 4:
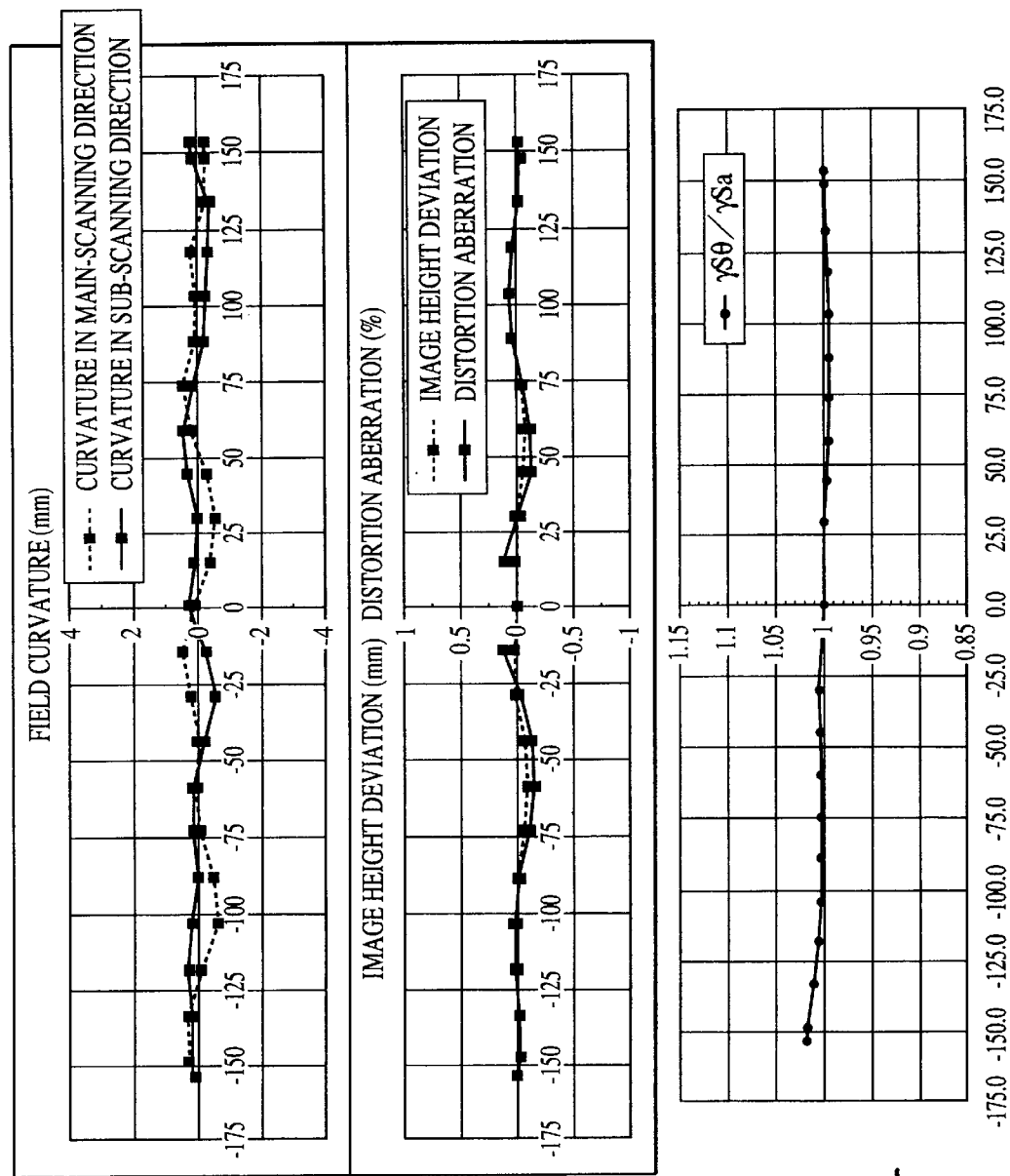
FIG. 4 is a diagram showing the changes in the field curvature, distortion aberration, and angular magnification in the first embodiment in accordance with the present invention.

Table 1 below shows the coefficients representing the surface shapes and other characteristics of the lenses used in the first embodiment. FIG. 3 shows the refractive powers of the first and second toric lenses in the sub-scanning direction in the first embodiment. FIG. 4 shows the field curvature in relation to distortion aberration in the first embodiment, and it also illustrates the changes in angular magnification with the center providing the reference; from the diagram, it can be seen that the aberrations have been adequately compensated for to the level at which there is substantially no problem in practical use.

TABLE 1

DATA

| | | | | Shape of First Lens | | Shape of Second Lens | |
|---|---|---|---|---|---|---|---|
| Working Wavelength | λ(nm) | 780 | | | | | |
| Refractive Index of First Lens | n1 | 1.5242 | | First Surface | Second Surface | First Surface | Second Surface |
| Refractive Index of Second Lens | n2 | 1.5242 | R | −67.97 | −49.663 | 46.718 | 45.398 |
| Polygon Incident Angle | θi | −60 | KU | −0.559322 | 0.0376036 | −9.14521 | −9.47556 |
| Polygon Max. Exiting Angle | θMax | 41.437 | B4U | 0.00000110565 | 0.00000120743 | −0.000000563241 | −0.00000103507 |
| Polygon - First Lens | e1 | 41.777 | B6U | 0.0000000000555 | 0.00000000080406 | −0.000000000086 | 0.00000000009461 |
| Central Thickness of First Lens | d1 | 9.5 | B8U | 0 | −0.0000000000003 | 3.523820000e-14 | −1.308180000e-14 |
| First Lens - Second Lens | e2 | 7.133 | B10U | 0 | 1.6306000000e-16 | −2.32284000e-18 | 1.9591800000e-18 |
| Central Thickness of Second Lens | d2 | 8.6 | KL | Same as KU | 0.0286653 | Same as KU | Same as KU |
| Second Lens - Plane to be Scanned | Sk | 189.74 | B4L | Same as B4U | 0.00000115642 | Same as B4U | Same as B4U |
| Focal Length of fθ Lens | ft | 251.05 | B6L | Same as B6U | 0.00000000084656 | Same as B6U | Same as B6U |
| Convergence of Collimator | fc | 1155 | B8L | Same as B8U | −0.0000000000003 | Same as B8U | Same as B8U |
| Polygon - Natural Convergent Point | | | B10L | Same as B10U | 1.6307300000e-16 | Same as B10U | Same as B10U |
| | | | r | −29 | −22.884 | −68 | −25.59 |
| f6 | 298.474 | | D2U | 0 | −0.000205716 | 0.00187374 | 0.000996409 |
| f7 | 2470.086 | | D4U | 0 | 0.0000000619717 | 0.00000190851 | −0.000000492908 |
| f6/f7 | 0.121 | | D6U | 0 | 0 | 0 | 0.00000000012598 |
| $r_{sc}$ | 0.338 | | D8U | 0 | 0 | 0 | −1.581770000e-14 |
| | | | D10U | 0 | 0 | 0 | 7.6398000000e-19 |
| | | | D2L | Same as D2U | −0.000180986 | Same as D2U | Same as D2U |
| | | | D4L | Same as D4U | 0.0000000555638 | Same as D4U | Same as D4U |
| | | | D6L | Same as D6U | 0 | Same as D6U | Same as D6U |
| | | | D8L | Same as D8U | 0 | Same as D8U | Same as D8U |
| | | | D10L | Same as D10U | 0 | Same as D10U | Same as D10U |

In this embodiment, the axis of symmetry of the second toric lens 7 in the main scanning direction is inclined by 10 minutes clockwise about the apex of the lens surface facing the optical deflector 5 in the main scanning cross section with respect to the normal to the plane 8 to be scanned.

The surface shapes of the second toric lens 7 are symmetric with respect to the optical axis of the toric lens itself in the main scanning cross section in both directions of the generating line and the generated line.

Figure 5:
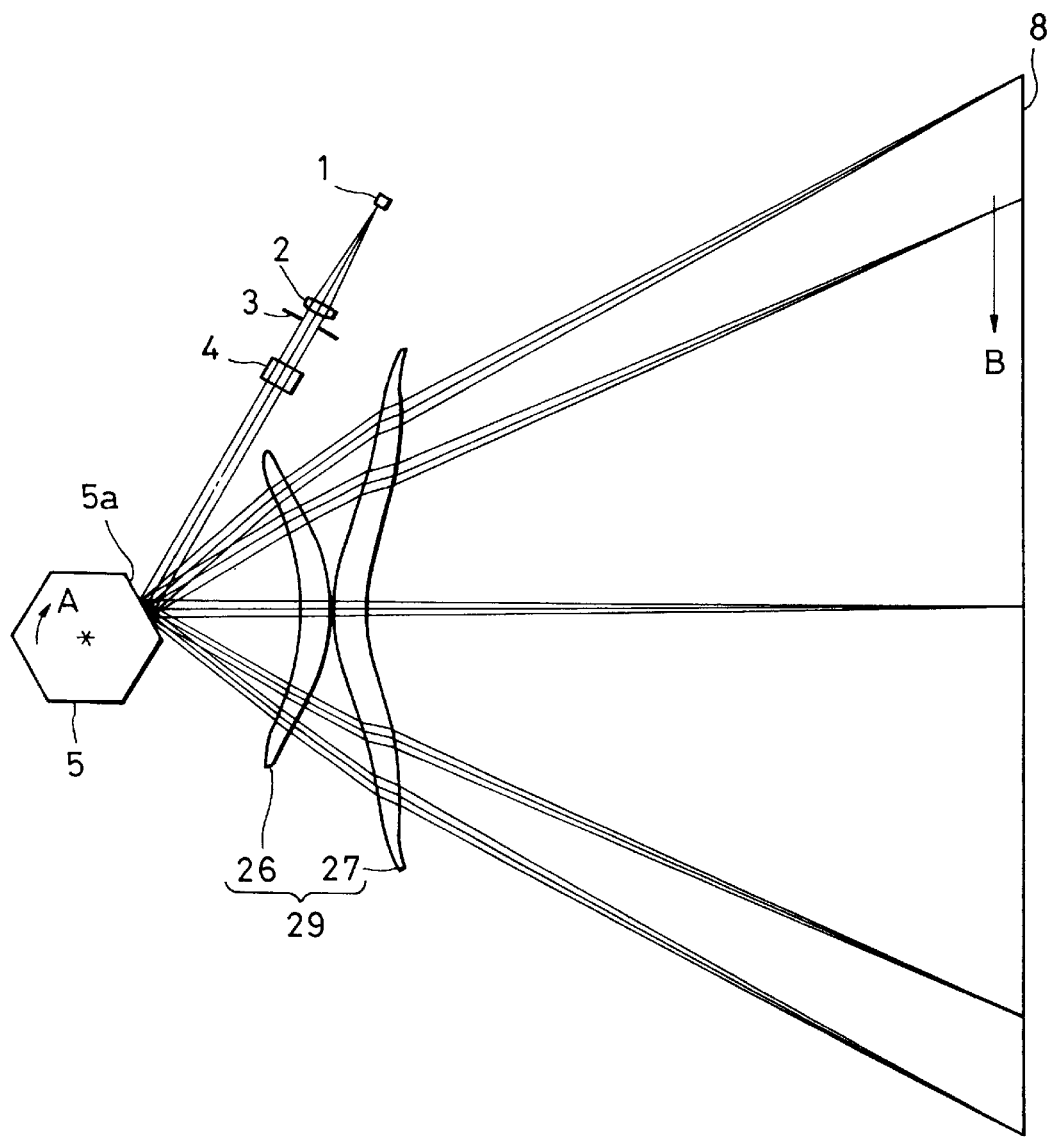
FIG. 5 is a sectional view showing an essential section in the main scanning direction of a second embodiment of the optical scanning apparatus in accordance with the present invention.

FIG. 5 is a sectional view showing an essential part in the main scanning direction (the main scanning cross section) of a second embodiment of the optical scanning apparatus in accordance with the present invention. In the drawing, like elements as those shown in FIG. 2 will be assigned like reference numerals.

As compared with the first embodiment shown in FIG. 2, the second embodiment is characterized in that first and second toric lenses 26 and 27 constituting a third optical device 29 have lens shapes ideally suited to the six-facet polygon mirror as shown in Table 2 given below. The rest of the configuration and the optical operation of the second embodiment is almost identical to those of the first embodiment; hence the second embodiment also provides the similar advantages.

Figure 6:
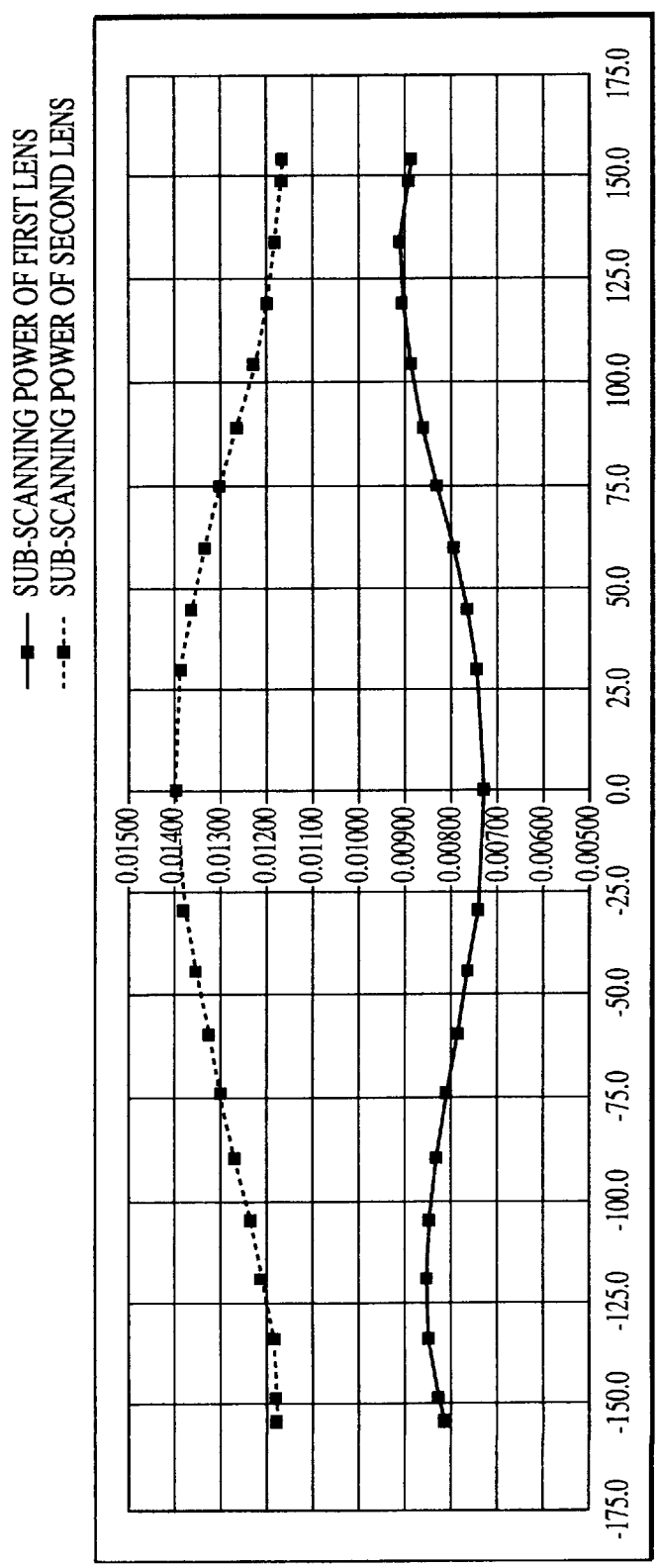
FIG. 6 is a schematic representation illustrative of the refractive powers in the sub-scanning direction of first and second toric lenses of the second embodiment in accordance with the present invention.
Figure 7:
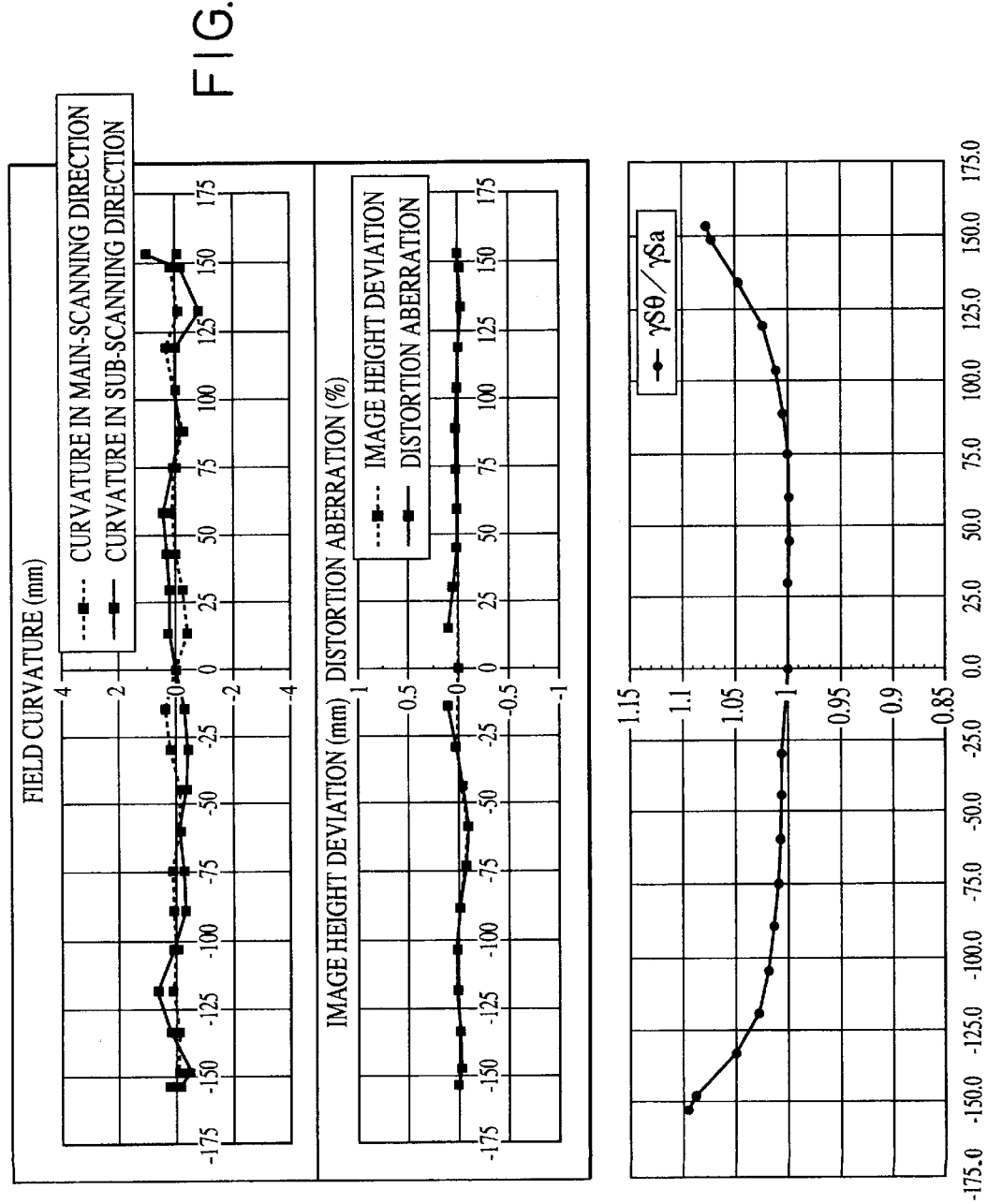
FIG. 7 is a diagram showing the changes in the field curvature, distortion aberration, and angular magnification in the second embodiment in accordance with the present invention.

Table 2 below shows the coefficients representing the shapes and other characteristics of the lenses used in the second embodiment. FIG. 6 shows the refractive powers of the first and second toric lenses in the sub-scanning direction in the second embodiment. FIG. 7 shows the field curvature in relation to distortion aberration in the second embodiment, and it also illustrates the changes in angular magnification with the center providing the reference; from the diagram, it can be seen that the aberrations have been adequately compensated for to the level at which there is substantially no problem in practical use.

TABLE 2

DATA

| Working Wavelength | λ(nm) | 780 | | Shape of First Lens | | Shape of Second Lens | |
|---|---|---|---|---|---|---|---|
| Refractive Index of First Lens | n1 | 1.524 | | First Surface | Second Surface | First Surface | Second Surface |
| Refractive Index of Second Lens | n2 | 1.524 | R | −62.49 | −55.58 | 43 | 49 |
| Polygon Incident Angle | θi | −60 | KU | −3.70908 | 0.36798 | −5.21726 | −6.02921 |
| Polygon Max. Exiting Angle | θMax | 41.437 | B4U | −0.000000502842 | −0.0000000138321 | −0.000000531432 | −0.000000926641 |
| Polygon - First Lens | e1 | 44.1614 | B6U | 0.0000000003567 | 0.00000000143597 | −0.000000000091 | 0.00000000007308 |
| Central Thickness of First Lens | d1 | 8.5 | B8U | 8.144520000e-14 | −0.0000000000007 | 3.634640000e-14 | −9.058470000e-15 |
| First Lens - Second Lens | e2 | 1 | B10U | 0 | 3.1129000000e-16 | −2.11543000e-18 | 2.1107400000e-18 |
| Central Thickness of Second Lens | d2 | 9.5 | KL | Same as KU | 0.371585 | Same as KU | Same as KU |
| Second Lens - Plane to be Scanned | Sk | 193.578 | B4L | Same as B4U | −0.000000105792 | Same as B4U | Same as B4U |
| Focal Length of fθ Lens | ft | 250.45 | B6L | Same as B6U | 0.00000000162157 | Same as B6U | Same as B6U |
| Convergence of Collimator | fc | 1157 | B8L | Same as B8U | −0.0000000000008 | Same as B8U | Same as B8U |
| Polygon - Natural Convergent Point | | | B10L | Same as B10U | 3.4947100000e-16 | Same as B10U | Same as B10U |
| | | | r | −29.5 | −22.99 | −67.76 | −25.31 |
| f6 | 673.942 | | D2U | 0 | −0.000167982 | 0.00201954 | 0.00099252 |
| f7 | 433.728 | | D4U | 0 | 0.0000000618943 | 0.00000124093 | −0.000000401812 |
| f6/f7 | 1.554 | | D6U | 0 | 0 | 0.0000000008935 | 0.00000000004964 |
| $r_{sc}$ | 0.325 | | D8U | 0 | 0 | −4.01765000e-13 | 5.3383800000e-15 |
| | | | D10U | 0 | 0 | 5.615490000e-17 | −1.168710000e-18 |
| | | | D2L | Same as D2U | −0.000148743 | Same as D2U | Same as D2U |
| | | | D4L | Same as D4U | 0.0000000634312 | Same as D4U | Same as D4U |
| | | | D6L | Same as D6U | 0 | Same as D6U | Same as D6U |
| | | | D8L | Same as D8U | 0 | Same as D8U | Same as D8U |
| | | | D10L | Same as D10U | 0 | Same as D10U | Same as D10U |

In this embodiment, the axis of symmetry of the second toric lens 27 in the main scanning direction is inclined by 10 minutes clockwise about the apex of the lens surface facing the optical deflector 5 in the main scanning cross section with respect to the normal line of the plane 8 to be scanned.

Figure 8:
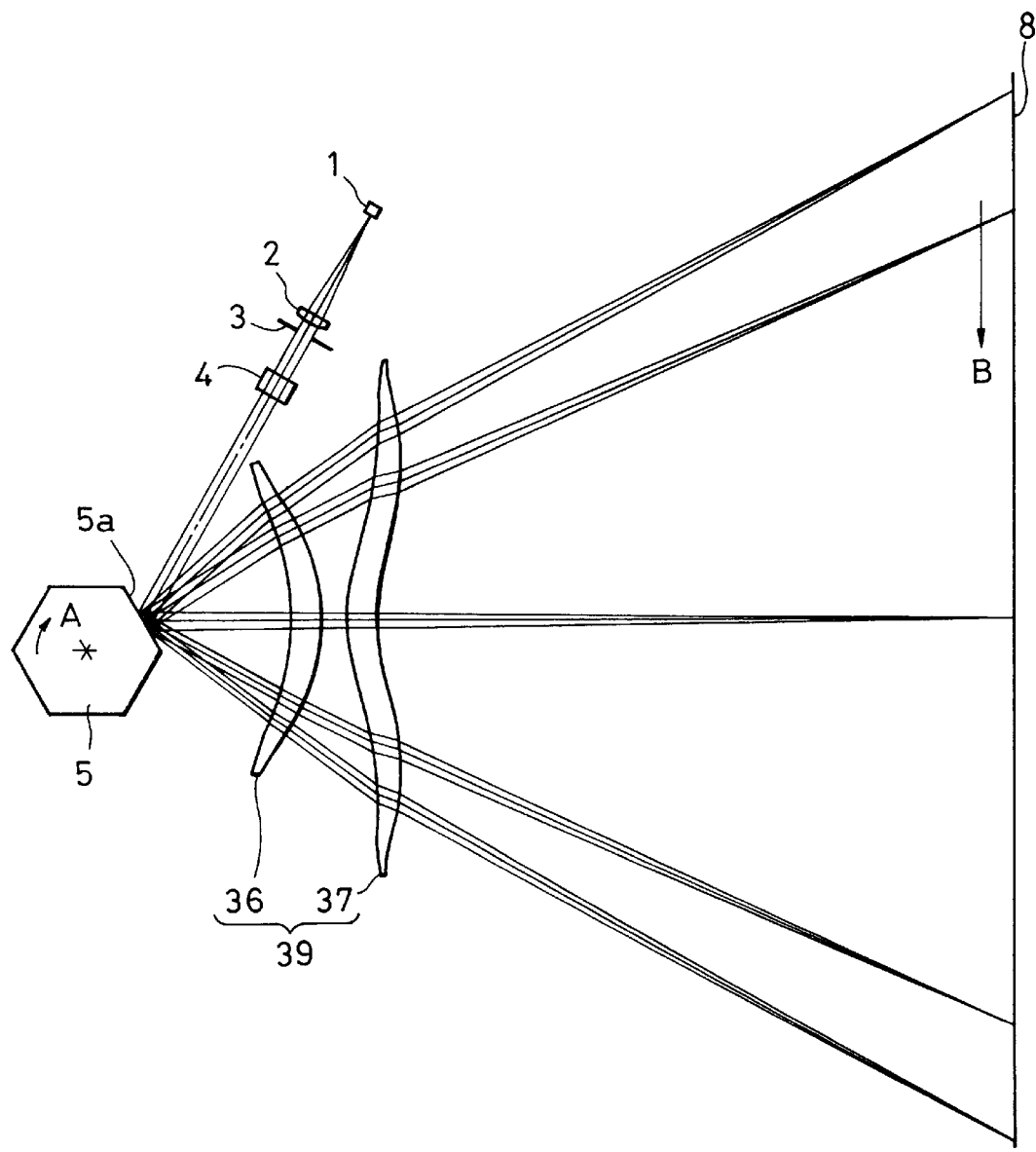
FIG. 8 is a sectional view showing an essential section in the main scanning direction of a third embodiment of the optical scanning apparatus in accordance with the present invention.

FIG. 8 is a sectional view showing an essential part in the main scanning direction (the main scanning cross section) of a third embodiment of the optical scanning apparatus in accordance with the present invention. In the drawing, like elements as those shown in FIG. 2 will be assigned the like reference numerals.

As compared with the first embodiment shown in FIG. 2, the third embodiment is characterized in that first and second toric lenses 36 and 37 constituting a third optical device 39 have lens shapes ideally suited to the six-facet polygon mirror as shown in Table 3 given below. The rest of the configuration and the optical operation of the third embodiment is almost identical to those of the first embodiment; hence the third embodiment also provides the similar advantages.

Figure 9:
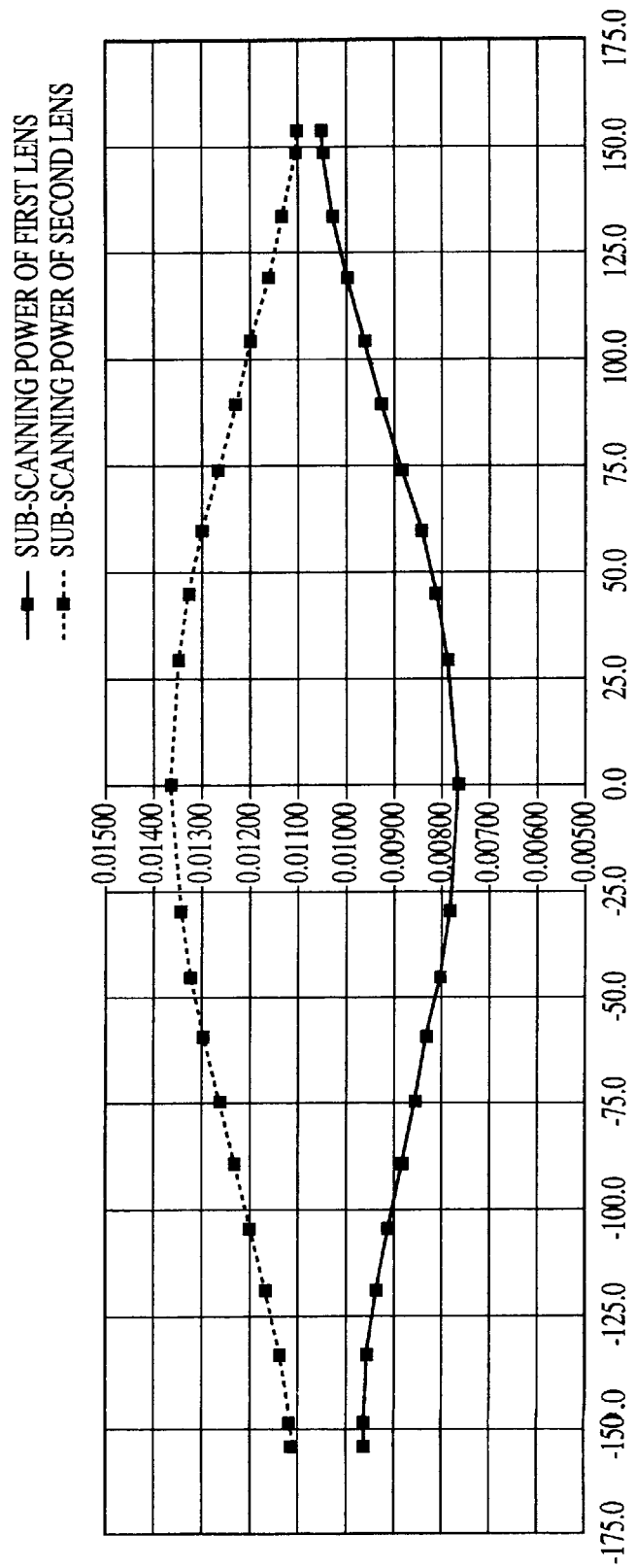
FIG. 9 is a schematic representation illustrative of the refractive powers in the sub-scanning direction of first and second toric lenses of the third embodiment in accordance with the present invention.
Figure 10:
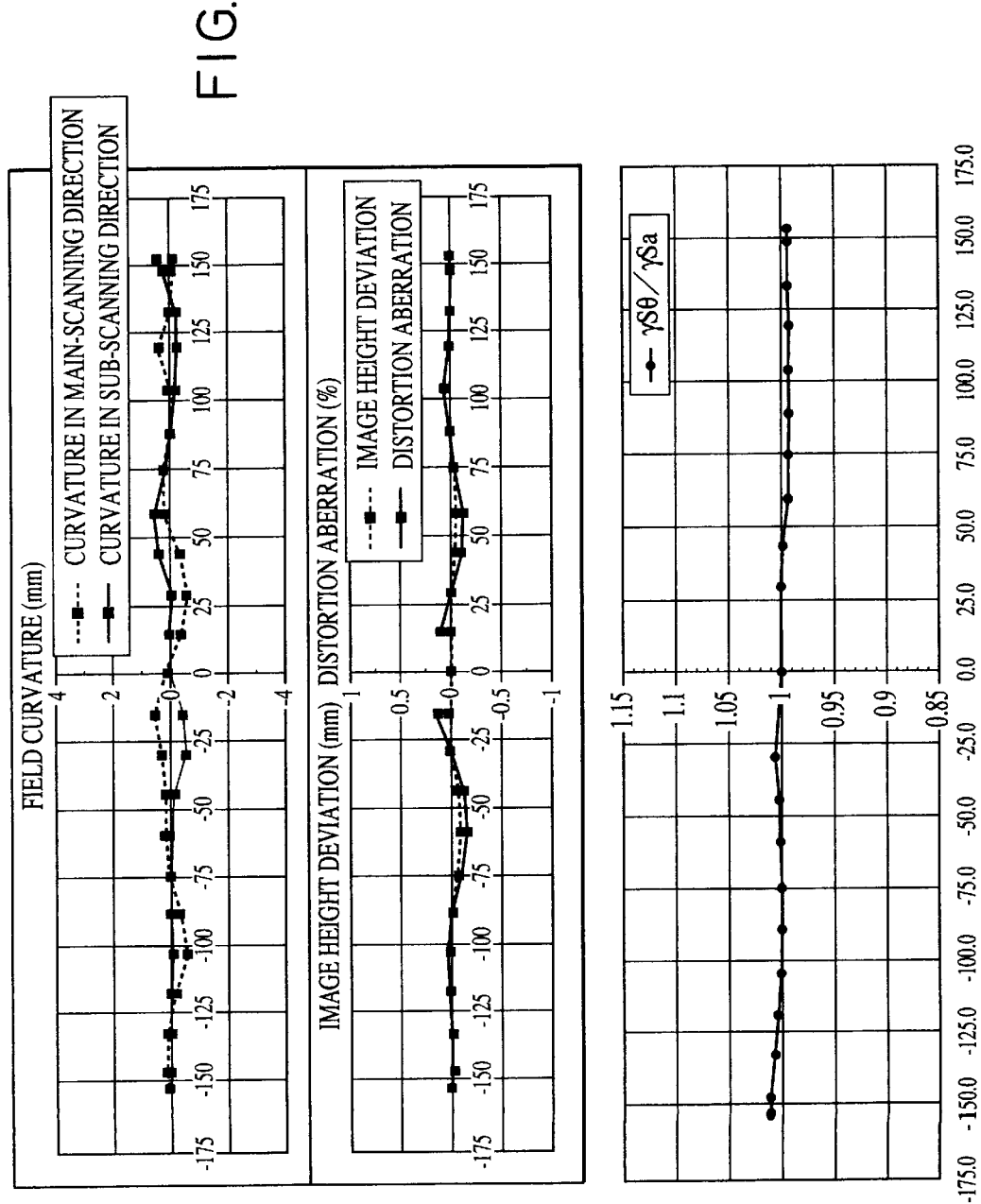
FIG. 10 is a diagram showing the changes in the field curvature, distortion aberration, and angular magnification in the third embodiment in accordance with the present invention.

Table 3 below shows the coefficients representing the surface shapes and other characteristics of the lenses used in the third embodiment. FIG. 9 shows the refractive powers of the first and second toric lenses in the sub-scanning direction in the third embodiment. FIG. 10 shows the field curvature in relation to distortion aberration in the third embodiment, and it also illustrates the changes in angular magnification with the center providing the reference; from the diagram, it can be seen that the aberrations have been adequately compensated for to such a level that there is substantially no problem in practical use.

TABLE 3

DATA

| Working Wavelength | λ(nm) | 780 | | Shape of First Lens | | Shape of Second Lens | |
|---|---|---|---|---|---|---|---|
| | | | | First Surface | Second Surface | First Surface | Second Surface |
| Refractive Index of First Lens | n1 | 1.5242 | | | | | |
| Refractive Index of Second Lens | n2 | 1.5242 | R | −67.97 | −49.663 | 46.718 | 45.398 |
| Polygon Incident Angle | θi | −60 | KU | −0.386489 | 0.0406645 | −9.1501 | −9.47556 |
| Polygon Max. Exiting Angle | θMax | 41.437 | B4U | 0.0000011819 | 0.00000120604 | −0.000000565087 | −0.00000103507 |
| Polygon - First Lens | e1 | 41.73 | B6U | 0.0000000000555 | 0.00000000080567 | −0.000000000085 | 0.00000000009461 |
| Central Thickness of First Lens | d1 | 9.5 | B8U | 0 | −0.0000000000003 | 3.523820000e-14 | −1.308180000e-14 |
| First Lens - Second Lens | e2 | 7.21 | B10U | 0 | 1.6306000000e-16 | −2.32284000e-18 | 1.9591800000e-18 |
| Central Thickness of Second Lens | d2 | 8.6 | KL | Same as KU | 0.0281781 | Same as KU | Same as KU |
| Second Lens - Plane to be Scanned | Sk | 189.71 | B4L | Same as 134U | 0.0000011631 | Same as B4U | Same as G4U |
| Focal Length of fθ Lens | ft | 251.05 | B6L | Same as B6U | 0.00000000083822 | Same as B6U | Same as B6U |
| Convergence of Collimator | fc | 1157 | B8L | Same as B8U | −0.0000000000008 | Same as B8U | Same as B8U |
| Polygon - Natural Convergent Point | | | B10L | Same as B10U | 1.6307300000e-16 | Same as B10U | Same as B10U |
| | | | r | −29.5 | −22.9 | −68 | −25.59 |
| f6 | 298.474 | | D2U | 0 | −0.000205789 | 0.00187374 | 0.000996409 |
| f7 | 2470.09 | | D4U | 0 | 0.0000000614589 | 0.00000190851 | −0.000000492908 |
| f6/f7 | 0.121 | | D6U | 0 | 0.0000000000002 | 0 | 0.00000000012598 |
| $r_{sc}$ | 0.337 | | D8U | 0 | 0 | 0 | −1.581770000e-14 |
| | | | D10U | 0 | 0 | 0 | 7.6398000000e-19 |
| | | | D2L | Same as D2U | −0.000181005 | Same as D2U | Same as D2U |
| | | | D4L | Same as D4U | 0.0000000519452 | Same as D4U | Same as D4U |
| | | | D6L | Same as D6U | 0.00000000000281 | Same as D6U | Same as D6U |
| | | | D8L | Same as D8U | 0 | Same as D8U | Same as D8U |
| | | | D10L | Same as D10U | 0 | Same as D10U | Same as D10U |

In this embodiment, the axis of symmetry of the second toric lens 37 in the main scanning direction is inclined by 10 minutes clockwise about the apex of the lens surface facing the optical deflector 5 in the main scanning cross section with respect to the normal to the plane 8 to be scanned.

Thus, according to the present invention, it is possible to implement a compact optical scanning apparatus which is suited for high-resolution printing and which compensates for field curvature and/or distortion aberration and prevents changes in spot diameter in the sub-scanning direction attributable to changes in the height of images by combining two lenses having appropriate shapes to constitute an fθ lens unit for forming a convergent light beam from a collimator lens onto a plane to be scanned via an optical deflector.

Moreover, configuring the fθ lens unit by using the two lenses enables the central thickness in the direction of the optical axis of each of the lenses to be decreased. This makes it possible to shorten the cycle time when plastic-molding the two lenses, resulting in lower cost of the optical scanning apparatus.

What is claimed is:

1. An optical scanning apparatus comprising:

light source means;

a deflecting device for deflecting a luminous flux emitted from said light source means;

optical means for guiding the luminous flux emitted from said light source means to a deflecting surface of said deflecting device; and an optical device for forming the luminous flux which has been deflected by said deflecting device into a spot-shaped image on a plane to be scanned;

wherein said optical device has a first toric lens and a second toric lens disposed in the mentioned order from said deflecting device;

in a main scanning cross section said first toric lens has both lens surfaces thereof formed to aspherical shapes and has a meniscus shape which provides a concave surface facing said deflecting device in a vicinity of a center of scanning and which provides a positive refractive power;

in the main scanning cross section said second toric lens has both lens surfaces thereof formed into aspherical shapes and has a meniscus which provides a convex surface facing said deflecting device in the vicinity of the center of scanning and which provides a positive refractive power; and lens sections of said first toric lens and said second toric lens perpendicular to a generating line, in a sub-scanning cross section, both have meniscus shapes which provide concave surfaces facing said deflecting device and which provide a positive refractive power.

2. An optical scanning apparatus according to claim 1, wherein a curvature of a lens surface of said second toric lens, which lens surface faces the plane to be scanned, continuously changes from a center of the lens toward a periphery of the lens in the main scanning cross section and a sign of the curvature is reversed in a middle part therebetween.

3. An optical scanning apparatus according to claim 1, wherein said first toric lens and said second toric lens are fabricated by plastics molding.

4. An optical scanning apparatus according to claim 1, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens.

5. An optical scanning apparatus according to claim 1, wherein a curvature of a lens surface of said second toric lens in the sub-scanning cross section changes laterally symmetrically in the main scanning direction from a center of the lens.

6. An optical scanning apparatus according to claim 1, wherein an axis of symmetry of said second toric lens in the main scanning direction is inclined in the main scanning cross section with respect to a normal of said plane to be scanned.

7. An optical scanning apparatus according to claim 1, wherein, if the focal lengths of said first toric lens and said second toric lens in the main scanning cross section are denoted as f6 and f7, respectively, then a following condition is satisfied:

$$0.08 < f6/f7 < 0.17.$$

8. An optical scanning apparatus according to claim 1, wherein, in said first toric lens, curvature of a lens surface thereof facing the surface to be scanned in the sub-scanning cross section changes laterally asymmetrically from a center of a lens toward the periphery of the lens.

9. An optical scanning apparatus according to claim 1, wherein said third optical device satisfies a condition given below when a angular magnification at central part of an effective image on the plane to be scanned in the sub-scanning cross section between said deflecting device and said plane to be scanned is denoted as $r_{SC}$:

$$0.25 < r_{SC} < 0.67.$$

10. An optical scanning apparatus according to claim 1, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens; and said third optical device satisfies a condition shown below when an angular magnification at a central part of an effective image on the plane to be scanned in the sub-scanning cross section between said deflecting device and said plane to be scanned is denoted as $r_{SC}$ and an angular magnification at an arbitrary point in an entire image area is denoted as $r_{SO}$:

$$0.85 < r_{SO}/r_{SC} < 1.15.$$

11. An optical scanning apparatus according to claim 1, wherein said optical means comprises first optical means for converting the luminous flux emitted from said light source means into a convergent light beam, and second optical means for forming the luminous flux emitted from said first optical means into a line shaped, longitudinal image in a main scanning direction on the deflecting surface of said deflecting device.

12. An optical scanning apparatus comprising:

light source means;

a deflecting device for deflecting a luminous flux emitted from said light source means;

optical means for forming the luminous flux emitted from said light source means to a deflecting surface of said deflecting device; and an optical device for forming the luminous flux which has been deflected by said deflecting device into a spot-shaped image on a plane to be scanned;

wherein said optical device has a first toric lens and a second toric lens disposed in the mentioned order from said deflecting device;

in a main scanning cross section said first toric lens has both lens surfaces thereof formed to aspherical shapes and has a meniscus shape which provides a concave surface facing said deflecting device in a vicinity of a center of scanning and which provides a positive refractive power;

in the main scanning cross section said second toric lens has both lens surfaces thereof formed into aspherical shapes and has a meniscus shape which provides a convex surface facing said deflecting device in the vicinity of the center of scanning and which provides a positive refractive power;

lens sections of said first toric lens and said second toric lens perpendicular to a generating line, in a sub-scanning cross section, both have meniscus shapes which provide concave surfaces facing said deflecting device and which provide a positive refractive power; and if the focal lengths of said first toric lens and said second toric lens in the main scanning cross section are denoted as f6 and f7, respectively, then a condition shown below is satisfied:

$$0.08 < f6/f7 < 2.0.$$

13. An optical scanning apparatus according to claim 12, wherein, in said second toric lens, the curvature of the lens surface facing said plane to be scanned continuously changes from the center of the lens toward the periphery of the lens in the main scanning cross section and a sign of the curvature is reversed in a middle part therebetween.

14. An optical scanning apparatus according to claim 12, wherein said first toric lens and said second toric lens are fabricated by plastics molding.

15. An optical scanning apparatus according to claim 12, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens.

16. An optical scanning apparatus according to claim 12, wherein a curvature of a lens surface of said second toric lens in the sub-scanning cross section changes laterally symmetrically in the main scanning direction from a center of the lens.

17. An optical scanning apparatus according to claim 12, wherein an axis of symmetry of said second toric lens in the main scanning direction is inclined in the main scanning cross section with respect to a normal of said plane to be scanned.

18. An optical scanning apparatus according to claim 12, wherein, in said first toric lens, a curvature of a lens surface thereof facing the surface to be scanned in the sub-scanning cross section changes laterally asymmetrically from a center of the lens toward a periphery of the lens.

19. An optical scanning apparatus according to claim 12, wherein said third optical device satisfies a condition given below when an angular magnification at a central part of an effective image on the plane to be scanned in the sub-scanning cross section between said deflecting device and said plane to be scanned is denoted as $r_{SC}$:

$$0.25 < r_{SC} < 0.67.$$

20. An optical scanning apparatus according to claim 12, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens; and said third optical device satisfies a condition shown below when an angular magnification at a central part of an effective image on the plane to be scanned in the sub-scanning cross section between said deflecting device and said plane to be scanned is denoted as $r_{SC}$ and an angular magnification at an arbitrary point in an entire image area is denoted as $r_{SO}$:

$$0.85 < r_{SO}/r_{SC} < 1.15.$$

21. An optical scanning apparatus according to claim 12, wherein said optical means comprises first optical means for converting the luminous flux emitted from said light source means into a convergent light beam, and second optical means for forming the luminous flux emitted from said first optical means into a line shaped, longitudinal image in a main scanning direction on the deflecting surface of said deflecting device.

22. A laser beam printer apparatus comprising:

light source means;

a deflecting device for deflecting a luminous flux emitted from said light source means;

optical means for guiding the luminous flux emitted from said light source means to a deflecting surface of said deflecting device; and an optical device for forming the luminous flux which has been deflected by said deflecting device into a spot-shaped image on a plane of a recording medium;

wherein said optical device has a first toric lens and a second toric lens disposed in the mentioned order from said deflecting device;

in a main scanning cross section said first toric lens has both surfaces thereof formed to aspherical shapes and has a meniscus shape which provides a concave surface facing said deflecting device in a vicinity of a center of scanning and which provides a positive refractive power;

in the main scanning cross section said second toric lens has both lens surfaces thereof formed into aspherical shapes and has a meniscus shape which provides a convex surface facing said deflecting device in the vicinity of the center of scanning and which provides a positive refractive power; and lens sections of said first toric lens and said second toric lens perpendicular to a generating line, in a sub-scanning cross section, both have meniscus shapes which provide concave surfaces facing said deflecting device and which provide a positive refractive power.

23. A laser beam printer apparatus according to claim 22, wherein a curvature of a lens surface of said second toric lens, which lens surface faces a plane of said recording medium, continuously changes from a center of the lens toward a periphery of the lens in the main scanning cross section and a sign of the curvature is reversed in a middle part therebetween.

24. A laser beam printer apparatus according to claim 22, wherein said first toric lens and said second toric lens are fabricated by plastics molding.

25. A laser beam printer apparatus according to claim 22, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens.

26. A laser beam printer apparatus according to claim 22, wherein a curvature of a lens surface of said second toric lens in the sub-scanning cross section changes laterally symmetrically in the main scanning direction from a center of the lens.

27. A laser beam printer apparatus according to claim 22, wherein an axis of symmetry of said second toric lens in the main scanning direction is inclined in the main scanning cross section with respect to a normal of the plane of said recording medium.

28. A laser beam printer apparatus according to claim 22, wherein if the focal lengths of said first toric lens and said second toric lens in the main scanning cross section are denoted as f6 and f7, respectively, then a following condition is satisfied:

$$0.08 < f6/f7 < 0.17.$$

29. A laser beam printer apparatus according to claim 22, wherein in said first toric lens, a curvature of a lens surface thereof facing the plane of said recording medium in the sub-scanning cross section changes laterally asymmetrically from a center of the lens toward periphery of the lens.

30. A laser beam printer apparatus according to claim 22, wherein said third optical device satisfies a condition given below when an angular magnification at a central part of an effective image on the plane of said recording medium in the sub-scanning cross section between said deflecting device and the plane of said recording medium is denoted as $r_{SC}$:

$$0.25 < r_{SC} < 0.67.$$

31. A laser beam printer apparatus according to claim 22, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens; and said third optical device satisfies a condition shown below when an angular magnification at a central part of an effective image on the plane of said recording medium in the sub-scanning cross section between said deflecting device and said plane of said recording medium is denoted as $r_{SC}$ and an angular magnification at an arbitrary point in an entire image area is denoted as $r_{SO}$:

$$0.85 < r_{SO}/r_{SC} < 1.15.$$

32. A laser beam printer apparatus according to claim 22, wherein said optical means comprises first optical means for converting the luminous flux emitted from said light source means into a convergent light beam, and second optical means for forming the luminous flux emitted from said first optical means into a line shaped, longitudinal image in a main scanning direction on the deflecting surface of said deflecting device.

33. A laser beam printer apparatus comprising:

light source means;

a deflecting device for deflecting a luminous flux emitted from said light source means;

optical means for guiding the luminous flux emitted from said light source means to a deflecting surface of said deflecting device; and an optical device for forming the luminous flux which has been deflected by said deflecting device into a spot-shaped image on a plane of a recording medium;

wherein said optical device has a first toric lens and a second toric lens disposed in the mentioned order from said deflecting device;

in a main scanning cross section said first toric lens has both lens surfaces thereof formed into aspherical shapes and has a meniscus shape which provides a concave surface facing said deflecting device in a vicinity of a center of scanning and which provides a positive refractive power;

in the main scanning cross section said second toric lens has both surfaces thereof formed into aspherical shapes and has a meniscus shape which provides a convex surface facing said deflecting device in the vicinity of the center of scanning and which provides a positive refractive power;

lens sections of said first toric lens and said second toric lens perpendicular to a generating line, in a sub-scanning cross section, both have meniscus shapes which provide concave surfaces facing said deflecting device and which provide a positive refractive power; and if the focal lengths of said first toric lens and said second toric lens in the main scanning cross section are denoted as f6 and f7, respectively, then a condition shown below is satisfied:

$0.08 < f6/f7 < 2.0$.

34. A laser beam printer apparatus according to claim 33, wherein a curvature of a lens surface of said second toric lens, which lens surface faces the plane of said recording medium, continuously changes from a center of the lens toward a periphery of the lens in the main scanning cross section and a sign of the curvature is reversed in a middle part therebetween.

35. A laser beam printer apparatus according to claim 33, wherein said first toric lens and said second toric lens are fabricated by plastics molding.

36. A laser beam printer apparatus according to claim 33, wherein the refractive power of said first toric lens in the sub-scanning cross section continuously increases from a center of the lens toward periphery of the lens, whereas the refractive power of said second toric lens in the sub-scanning cross section continuously decreases from a center of the lens toward a periphery of the lens.

37. A laser beam printer apparatus according to claim 33, wherein a curvature of a lens surface of said second toric lens in the sub-scanning cross section changes laterally symmetrically in the main scanning direction from a center of the lens.

38. A laser beam printer apparatus according to claim 33, wherein an axis of symmetry of said second toric lens in the main scanning direction is inclined in the main scanning cross section with respect to a normal of the plane of said recording medium.

39. A laser beam printer apparatus according to claim 33, wherein, in said first toric lens, a curvature of a lens surface thereof facing the plane of said recording medium in the sub-scanning cross section changes laterally asymmetrically from a center of the lens toward a periphery of the lens.

40. A laser beam printer apparatus according to claim 33, wherein said third optical device satisfies a condition given below when an angular magnification at a central part of an effective image on the plane of said recording medium in the sub-scanning cross section between said deflecting device and the plane of said recording medium is denoted as $r_{SC}$:

$0.25 < r_{SC} < 0.67$.

41. A laser beam printer apparatus according to claim 33, wherein the refractive power of said first toric lens in the sub-scanning cross section continuously increases from a center of the lens toward a periphery of the lens, whereas the refractive power of said second toric lens in the sub-scanning cross section continuously decreases from a center of the lens toward a periphery of the lens; and said third optical device satisfies a condition shown below when an angular magnification at a central part of an effective image on the plane of said recording medium in the sub-scanning cross section between said deflecting device and said plane of said recording medium is denoted as $r_{SC}$ and an angular magnification at an arbitrary point in an entire image area is denoted as $r_{SO}$:

$0.85 < r_{SO}/r_{SC} < 1.15$.

42. A laser beam printer apparatus according to claim 33, wherein said optical means comprises first optical means for converting the luminous flux emitted from said light source means into a convergent light beam, and second optical means for forming the luminous flux emitted from said first optical means into a line shaped, longitudinal image in a main scanning direction on the deflecting surface of said deflecting device.

* * * * *

UNITED STATES PATENT AND TRADEMARK OFFICE
CERTIFICATE OF CORRECTION

PATENT NO. : 6,133,935
DATED : October 17, 2000
INVENTOR(S) : Kazuo Fujibayashi, et al.

It is certified that error appears in the above-identified patent and that said Letters Patent is hereby corrected as shown below:

Column 8,
Line 20, "sign" should read -- sign of the curvature --.

Column 10,
Line 23, "$D_{10L}$" should read -- $D_{10L}$ --.

Column 13,
Table 3, "G4U" should read -- B4U --.

Column 15,
Line 23, "a" should read -- an --; and "at" should read -- at a --.

Column 18,
Line 22, "toward" should read -- toward a --.

Signed and Sealed this

Sixteenth Day of October, 2001

*Attest:*

NICHOLAS P. GODICI
*Attesting Officer*     *Acting Director of the United States Patent and Trademark Office*